(12) United States Patent
Heitlinger et al.

(10) Patent No.: US 9,179,590 B2
(45) Date of Patent: Nov. 10, 2015

(54) STABILIZER FOR A LOWER LINK OF A THREE-POINT HITCH OF A TRACTOR

(75) Inventors: Martin Heitlinger, Oestringen (DE); Hanko Onken, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/239,480

(22) PCT Filed: Jul. 20, 2012

(86) PCT No.: PCT/EP2012/064253
§ 371 (c)(1),
(2), (4) Date: Feb. 18, 2014

(87) PCT Pub. No.: WO2013/026638
PCT Pub. Date: Feb. 28, 2013

(65) Prior Publication Data
US 2015/0047864 A1 Feb. 19, 2015

(30) Foreign Application Priority Data

Aug. 19, 2011 (DE) .......................... 10 2011 081 272

(51) Int. Cl.
*A01B 59/041* (2006.01)
(52) U.S. Cl.
CPC ..................................... *A01B 59/041* (2013.01)
(58) Field of Classification Search
USPC .......................................... 172/439, 450, 443
See application file for complete search history.

(56) References Cited

U.S. PATENT DOCUMENTS

| 3,825,283 | A | * | 7/1974 | Hansen | 172/439 |
| 4,194,757 | A | * | 3/1980 | Lucas et al. | 172/439 |
| 5,361,850 | A | * | 11/1994 | Muller et al. | 172/450 |
| 6,386,571 | B1 | * | 5/2002 | Vollmer et al. | 280/455.1 |
| 7,048,071 | B1 | * | 5/2006 | Huenink et al. | 172/439 |
| 8,851,199 | B2 | * | 10/2014 | Sauermann | 172/450 |
| 2012/0153552 | A1 | * | 6/2012 | Sauermann | 267/140.13 |
| 2014/0210183 | A1 | * | 7/2014 | Heitlinger et al. | 280/474 |

FOREIGN PATENT DOCUMENTS

| DE | 102009001907 | | 9/2010 |
| DE | 202010017641 | | 3/2012 |
| EP | 1342399 | | 4/2004 |
| EP | 2232973 | | 9/2010 |
| EP | 2 324 692 | * | 5/2011 |
| EP | 2457427 | | 5/2012 |

* cited by examiner

*Primary Examiner* — Gary Hartmann

(57) ABSTRACT

Stabilizer for a lower draft link of a three-point hitch of a tractor, the stabilizer comprising a first stabilizer member and a second stabilizer member which is movably connected to the first stabilizer member by a spring-loaded centering mechanism, wherein the second stabilizer member can be rotated with regard to the first stabilizer member to modify the overall length of the stabilizer. A locking bracket is pivotally connected to the first stabilizer member for blocking a rotation between the stabilizer members by engaging the locking bracket with a blocking groove formed in a circumference of the second stabilizer member. Furthermore, a locking cover is provided for disabling a movement between the stabilizer members in a closed position. A section of the locking cover is faced to the locking bracket, wherein the section is formed such in that the locking bracket can be removed from the blocking groove for releasing a rotation of the second stabilizer member even in the closed position of the locking cover.

9 Claims, 3 Drawing Sheets

STABILIZER FOR A LOWER LINK OF A THREE-POINT HITCH OF A TRACTOR

TECHNICAL FIELD

The invention relates to a stabilizer for a lower link of a three-point hitch of a tractor.

BACKGROUND

Such a stabilizer having a first and a second stabilizer member is known, for example, from DE 10 2009 001 907 A1. The stabilizer comprises, in addition to a locking flap which can be pivoted into a closed position in order to limit a resilient movement which occurs between the two stabilizer members, a pivotable curved securing member, by means of which a mutual rotation of the two stabilizer members and an associated adjustment of the total length of the stabilizer can be prevented. A recess formed in the locking flap enables operation of the curved securing member, even when the locking flap is in the closed position, which enables a lower link which is provided with the stabilizer to be twisted by hand when the mounted device is fitted. Since the stabilizer, as a result of its being fitted close to the ground, is subjected to comparatively high levels of contamination in the region of the lower link, particularly during field work, it is possible for this contamination to be deposited within the recess and for the operability of the curved securing member to be impaired in an undesirable manner.

SUMMARY

An object of the present invention is therefore to further improve a stabilizer of the type mentioned in the introduction with respect to its operability under adverse environmental conditions.

The stabilizer for a lower link of a three-point hitch of a tractor comprises a first stabilizer member and a second stabilizer member which is connected to the first stabilizer member in a resiliently movable manner, wherein the second stabilizer member is able to be rotated relative to the first stabilizer member in order to adapt the stabilizer length. A curved securing member which is pivotably articulated to the first stabilizer member can be brought into engagement with a securing slot which is formed in the periphery of the second stabilizer member in order to rotationally secure the two stabilizer members. There is further provided a locking flap which can be pivoted into a closed position in order to block a resilient movement which occurs between the stabilizer members. A locking flap portion which faces the curved securing member in the pivot direction is formed in such a manner that the curved securing member, with the second stabilizer member being released, can be pivoted out of the securing slot in order to twist a lower link which is provided with the stabilizer even when the locking flap is located in the closed position. Since the locking flap portion covers the curved securing member in a protective manner, clogging owing to deposited occurrences of contamination or the like is largely excluded.

Advantageous embodiments of the stabilizer according to the invention will be appreciated from the dependent claims.

The curved securing member is preferably articulated to the first stabilizer member in such a manner that it is pressed with pretensioning into the securing slot. In this manner, even in the event of travel-related vibrations, reliable rotation prevention of the two stabilizer members is obtained.

In addition, the curved securing member may be articulated to the first stabilizer member in such a manner that the active direction of the pretensioning when the curved securing member is pivoted outwards is reversed when a predetermined pivot angle is exceeded. That is to say, the curved securing member, when the predetermined pivot angle is exceeded, is pressed automatically into a position which releases the second stabilizer member so that the operator has both hands free to twist a lower link which is provided with the stabilizer. The locking flap portion facing the curved securing member in this instance ultimately forms a stop which limits the pivot movement. This may in particular be in the form of an indentation which tapers in the articulation direction of the curved securing member.

In order to simplify cleaning of the stabilizer, it is possible for the locking flap to be able to be secured by means of the curved securing member in a completely open position. To this end, the locking flap can be supported on the free end of the curved securing member.

The securing slot is in particular orientated in the direction of a resilient movement which occurs between the first stabilizer member and the second stabilizer member. The securing slot is of such a size that it completely receives a securing segment which is provided on the curved securing member. Since the curved securing member is capable of sliding along the securing slot, a resilient movement which occurs between the two stabilizer members is not impeded.

Furthermore, the securing slot may be formed in a locking projection which is formed on the periphery of the second stabilizer member. The locking projection is arranged on the second stabilizer member in such a manner that it is completely covered by the locking flap when the locking flap is in the closed position. A depositing of undesirable contamination in the region of the securing slot can in this manner be prevented from the outset.

In order to reduce the production complexity, the locking projection may be an integral component of the second stabilizer member which is constructed as a cast and/or forged component. However, it is also conceivable for the locking projection to be welded to the second stabilizer member as a separate component or to be fitted in some other manner. If it is a separate component, the locking projection may comprise a steel alloy which is harder or hardened with respect to the second stabilizer member in order to increase the wear resistance.

In order to allow multiple-stage twisting of a lower link provided with the stabilizer, a total of four locking projections may be formed on the periphery of the second stabilizer member in a crossed manner. The use of a total of four locking projections has been found to be particularly practical. In order to increase the rigidity, the locking projections can further be connected to each other by curved reinforcement ribs.

In order to block a resilient movement which occurs between the two stabilizer members, it is possible for a recess provided in the locking flap to engage with at least one of the locking projections at both sides in the closed position. In particular, the locking flap may have two opposing locking walls, each of which has a corresponding recess for the engagement of an associated locking projection.

It is further conceivable for the curved securing member to have at the free end thereof a gripping region which widens in the manner of an eyelet in order to facilitate operation with one finger. The gripping region which widens in the manner of an eyelet protrudes forwards on the locking flap in such a manner that it is readily accessible by hand from the outer side. The curved securing member which is in particular in the form of a curved securing member is produced from a steel alloy which is rust-resistant or which has been surface-treated in a comparable manner.

BRIEF DESCRIPTION OF THE DRAWINGS

The stabilizer according to the invention is explained in greater detail below with reference to the appended drawings. Different operating states of one and the same embodiment are set out. Components which correspond or are comparable with regard to their function have been given identical reference numerals. In the drawings.

DETAILED DESCRIPTION

Figure 1:
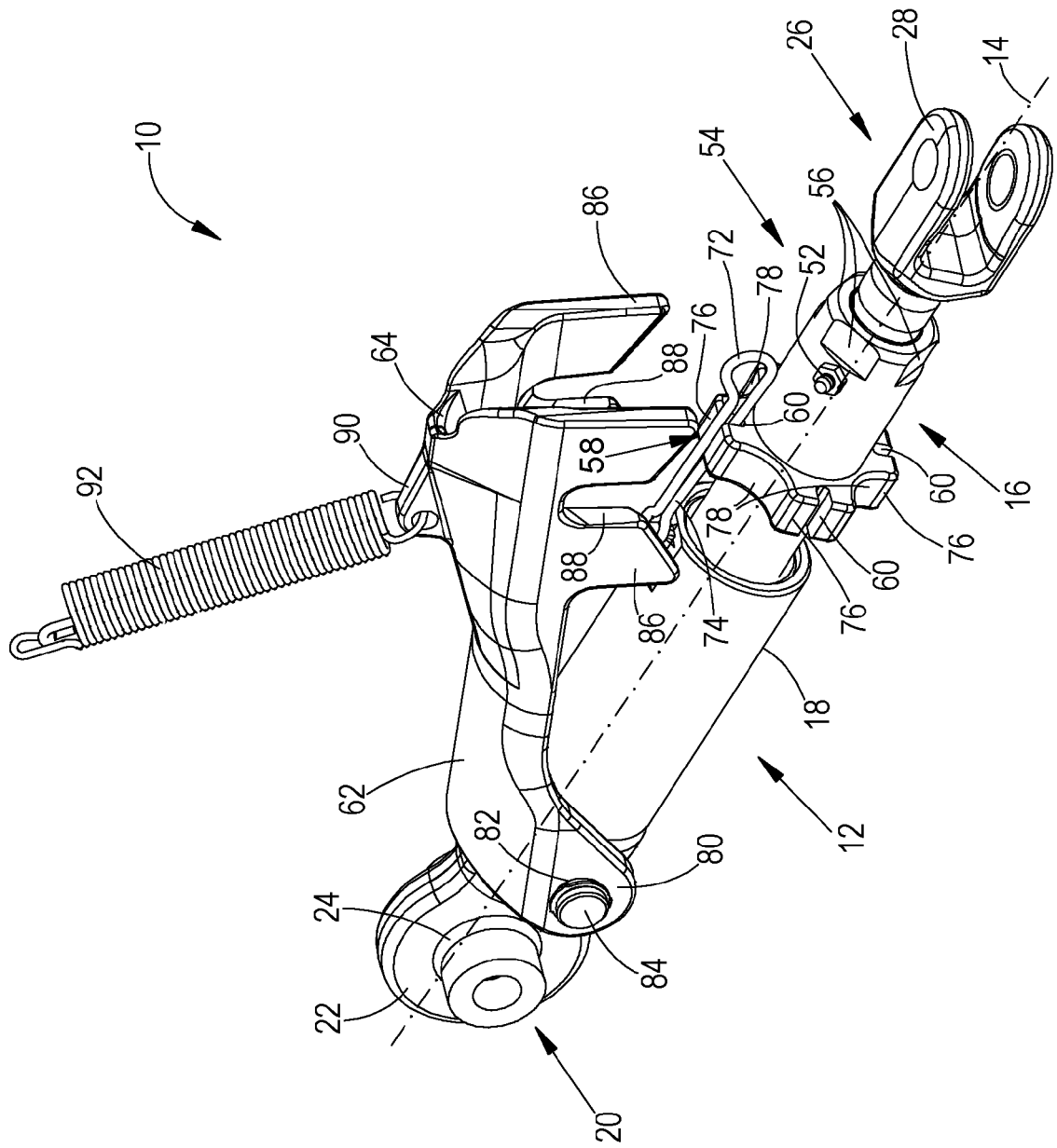
FIG. 1 is a perspective view of an embodiment of the stabilizer including a locking flap, the embodiment according to the invention for a lower link of a three-point hitch of a tractor.
Figure 2:
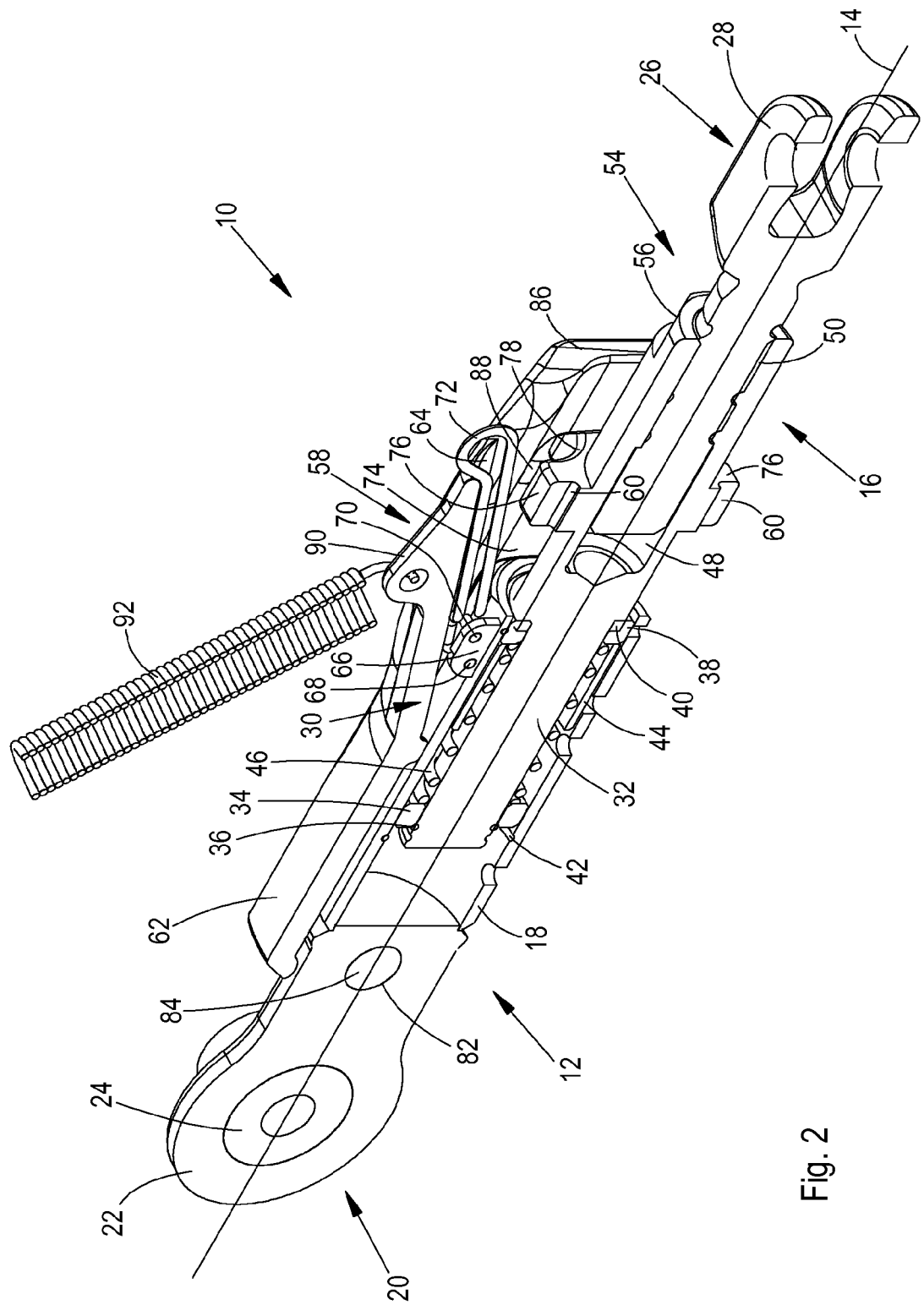
FIG. 2 is a sectional view taken along the longitudinal axis of FIG. 1 with the locking flap pivoted into a closed position.
Figure 3:
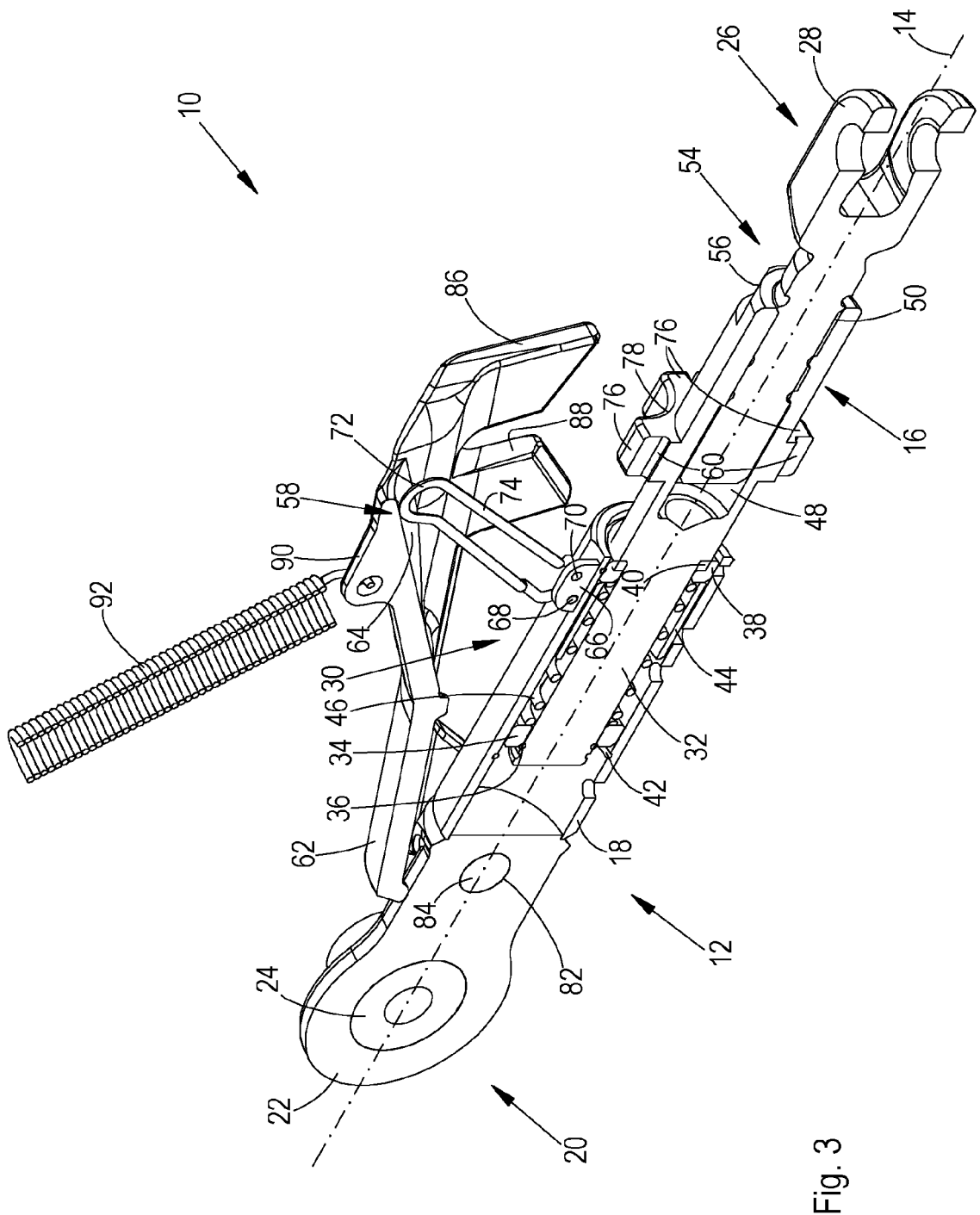
FIG. 3 is a sectional view similar to FIG. 2 but with the locking flap pivoted into an open position.

FIG. 1 is a perspective view of an embodiment of the stabilizer according to the invention for a lower link of a three-point hitch of a tractor, reference being made to the two sectioned illustrations in FIGS. 2 and 3 with regard to structural details.

The stabilizer 10 comprises a first stabilizer member 12 and a second stabilizer member 16 which is connected to the first stabilizer member 12 so as to be able to be resiliently moved along a common longitudinal axis 14, the second stabilizer member 16 being able to be rotated relative to the first stabilizer member 12 in order to adapt the stabilizer length with respect to the common longitudinal axis 14. The first stabilizer member 12 is a substantially cylindrical stabilizer housing 18, inside which the second stabilizer member 16 is guided.

In order to produce a tractor-side articulated connection, the first stabilizer member 12 comprises a spherical lug 20. The spherical lug 20 comprises a securing eyelet 22 which is formed in a securing region of the first stabilizer member 12 and a securing ball which is rotatably supported therein and which enables a spatial movement of the stabilizer 10 with respect to the tractor.

Furthermore, the second stabilizer member 16 comprises a securing member 26 for producing an articulated connection to a lower link of a three-point hitch. The securing member 26 has a securing fork 28 which can be fitted to the lower link, the articulated connection which can be produced with respect to the lower link by means of the securing fork 28 being articulated in such a perpendicular manner with respect to the tractor-side articulated connection in the assembled state that the stabilizer 10 can follow both horizontal and vertical redirections of the lower link.

By way of example, the second stabilizer member 16 is constructed as a resilient piston 30. As can be seen in the sectioned illustrations of the stabilizer 10 in FIGS. 2 and 3, the resilient piston 30 has a piston portion 32 with a reduced diameter, on which a first stop ring 34 is fitted in a sliding manner in a first end region. The first stop ring 34 is secured by means of a resilient ring 36 which engages in a groove which is formed in the periphery of the piston portion 32. Furthermore, a second stop ring 38 is fitted in a sliding manner in a second end region. The second stop ring 38 is supported on a collar 40 which is formed on the resilient piston 30. A spring ring 42 which is introduced into the stabilizer housing 18 and a spacing member 44 serve to limit a deflection and rebound movement which occurs on the resilient piston 30. A helical spring 46 which surrounds the piston portion 32 extends between the two stop rings 34 and 38. The helical spring 46 is compressed or pretensioned by means of the two stop rings 34 and 38 in such a manner that the resilient piston 30 is urged into a predetermined rest position. In this manner, self-centering of a lower link which is provided with the stabilizer 10 is ensured.

An inner thread 48 which is formed inside the second stabilizer member 16 engages on an outer thread 50 formed on the securing member 26 in such a manner that the stabilizer length can be adapted or adjusted by rotating the second stabilizer member 16 with respect to the first stabilizer member 12. A lubrication nipple 52 provided on the second stabilizer member 16 in this instance enables the thread turns to be lubricated with bearing grease.

A tool receiving member 54 is provided in order to rotatably actuate the second stabilizer member 16. The tool receiving member 54 has a plurality of flattened portions 56 which are provided for receiving a combination wrench so that, by inverting the combination wrench even under limited spatial conditions, the stabilizer length can be readily adjusted.

It should be noted that the illustration of the first stabilizer member 12 as a substantially cylindrical stabilizer housing 18 has a purely exemplary nature. Instead, a large number of other housing forms are also conceivable.

In order to prevent unintentional adjustment of the stabilizer length, there is provided a curved securing member 58 which is pivotably articulated to the first stabilizer member 12 and which can be brought into engagement with a securing slot 60 which is formed in the periphery of the second stabilizer member 16 in order to secure the two stabilizer members 12 and 16 against rotation. The curved securing member 58 which is constructed in this instance as a curved resilient member is articulated to the first stabilizer member 12 in such a manner that it is pressed with pretensioning into the securing slot 60. In this manner, even in the event of travel-related vibrations, reliable rotational securing of the two stabilizer members 12 and 16 is provided. The pretensioning is of such a magnitude that it remains possible to actuate the curved securing member 58 without the use of tools.

There is further provided a locking flap 62 which can be pivoted into a closed position illustrated in FIG. 2 in order to block a resilient movement which occurs between the stabilizer members 12 and 16. A locking flap portion 64 which faces the curved securing member 58 in the pivot direction is formed in such a manner that, with the second stabilizer member 16 being released, the curved securing member 58 can be pivoted out of the securing slot 60 in order to twist a lower link which is provided with the stabilizer 10 even when the locking flap 62 is located in the closed position.

A securing flap 66 which is arranged on the first stabilizer member 12 serves to retain the curved securing member 58. The securing flap 66 has two transverse holes 68 and 70 which are spaced apart in the direction of the common longitudinal axis 14, each of the two transverse holes 68 and 70 receiving one of the open ends of the curved securing member 58. The curved securing member 58 which is produced from a steel alloy which is rust-resistant or which has been surface-treated in a comparable manner is articulated to the first stabilizer member 12 in such a manner that the active direction of the pretensioning is reversed when the curved securing member 58 is pivoted outwards when a predetermined pivot angle is exceeded. That is to say, the curved securing member 58 is urged automatically into a position which releases the second stabilizer member 16 when the predetermined pivot angle is exceeded so that the operator has both hands free to twist a lower link which is provided with the stabilizer 10. The locking flap portion 64 which faces the curved securing member 58 in this instance ultimately forms a stop which limits the pivot movement. In this instance, it is in the form of an indentation which tapers in the articulation direction of the curved securing member 58.

In order to facilitate operation with one finger, the curved securing member 58 has at the free end thereof a gripping region 72 which widens in the manner of an eyelet. The gripping region 72 which widens in the manner of an eyelet protrudes on the locking flap 62 in such a manner that it is readily accessible by hand from the outer side.

In order to facilitate cleaning of the stabilizer 10, it is possible to secure the locking flap 62 by means of the curved securing member 58 in a completely open position. According to the illustration in FIG. 3, the locking flap 62 can to this end be supported on the free end of the curved securing member 58.

The securing slot 60 is orientated in the direction of a resilient movement which occurs between the first stabilizer member 12 and the second stabilizer member 16. The securing slot 60 is of such a size that it completely receives a securing segment 74 provided on the curved securing member 58. Since the curved securing member 58 is capable of sliding along the securing slot 60, a resilient movement which occurs between the two stabilizer members 12 and 16 is not impeded.

As can be seen in FIG. 1, the securing slot 60 is formed in a locking projection 76 which is formed at the periphery of the second stabilizer member 16. The locking projection 76 is arranged on the second stabilizer member 16 in such a manner that it is completely covered in the closed position of the locking flap 62 shown in FIG. 2. A deposit of undesirable contamination in the region of the securing slot 60 can thus be prevented from the outset. The locking projection 76 is—in the same manner as the tool receiving member 54—an integral component of the second stabilizer member 16 which is constructed as a cast and/or forged component.

In order to enable multiple-stage twisting of a lower link which is provided with the stabilizer 10, a total of four locking projections 76 are formed in a crossed manner on the periphery of the second stabilizer member 16. The locking projections 76 are additionally connected to each other by means of curved reinforcement ribs 78 in order to increase the rigidity.

The locking flap 62 which is produced as a cast and/or forged component is in the form of a half-shell which at least partially surrounds or encloses the first stabilizer member 12. The half-shell merges at one end into two opposing hinge flaps 80, in which there are formed mutually aligned holes 82 for receiving a hinge pin 84 which extends transversely relative to the common longitudinal axis 14 and consequently for producing a pivotable connection to the first stabilizer member 12. At the other end, there are provided two opposing locking walls 86, each of which has a separate fork-like recess 88 for dual-sided engagement of an associated locking projection 76 so that a resilient movement which occurs between the two stabilizer members 12 and 16 can be blocked when the locking flap 62 is in the closed position.

The width of the locking projections 76 is selected in such a manner that, regardless of the position of the two stabilizer members 12 and 16 with respect to each other, there is always sufficient overlap with respect to the two locking walls 86. In this manner, it is ensured that the locking projections 76 and consequently the second stabilizer member 16 can also be rotated under load with comparatively little resistance inside the recesses 88.

Optionally, there may also be formed on the locking flap 62 in place of the two locking walls 86 a single-sided stop with respect to a deflection movement which occurs between the two stabilizer members 12 and 16, as proposed in DE 10 2009 001 907 A1. In order to enable in this instance a mutual twisting of the lower links on a three-point hitch, separate stabilizers 10 are intended to be provided for each of the two possible movement directions.

A pulling flap 90 which is arranged on the locking flap 62 enables the locking flap 62 to be pivoted outwards from the closed position as indicated in FIG. 1 and consequently enables release of a deflection and rebound movement which occurs between the two stabilizer members 12 and 16. To this end, the pulling flap 90 can be connected to a corresponding securing location on the tractor by means of a tension spring 92.

The invention claimed is:

1. A stabilizer for a lower link of a three-point hitch of a tractor, the stabilizer comprising:
 a first stabilizer member; and
 a second stabilizer member which is connected to the first stabilizer member in a resiliently movable manner, wherein the second stabilizer member is able to be rotated relative to the first stabilizer member in order to adapt the stabilizer length;
 a curved securing member which is pivotably articulated to the first stabilizer member and which can be brought into engagement with a securing slot which is formed in the periphery of the second stabilizer member in order to rotationally secure the two stabilizer members; and
 a locking flap which can be pivoted into a closed position in order to block a resilient movement which occurs between the stabilizer members, the locking flap having a locking flap portion that protectively covers the curved securing member in the closed position, wherein the curved securing member, can also be pivoted out of the securing slot when the locking flap is located in the closed position and the second stabilizer member is released.

2. The stabilizer as claimed in claim 1, wherein the curved securing member is articulated to the first stabilizer member and is configured to be pressed with pretensioning into the securing slot.

3. The stabilizer as claimed in claim 2, wherein the curved securing member is configured to be reversed when a predetermined pivot angle is exceeded.

4. The stabilizer as claimed in claim 1, wherein the locking flap can be secured by curved securing member in a completely open position.

5. The stabilizer claimed in claim 4, wherein the securing slot is formed in a locking projection which is formed on a periphery of the second stabilizer member.

6. The stabilizer as claimed in claim 5, wherein the locking projection is an integral component of the second stabilizer member which is constructed as a cast and/or forged component.

7. The stabilizer as claimed in claim 6, wherein a total of four locking projections are formed on the periphery of the second stabilizer member in a crossed manner.

8. The stabilizer as claimed in claim 7, wherein the locking flap includes a recess that engages with at least one of the locking projections in the closed position.

9. The stabilizer as claimed in claim 1, wherein the curved securing member has a gripping region.

\* \* \* \* \*